United States Patent [19]

Schamesberger

[11] Patent Number: 5,468,543

[45] Date of Patent: Nov. 21, 1995

[54] PROCESS FOR PRODUCING A SKI COATING STRIP MADE OF ULTRA HIGH MOLECULAR-WEIGHT POLYETHYLENE

[75] Inventor: Robert Schamesberger, Eisenstadt, Austria

[73] Assignee: Isosport Verbundbauteile Gesellschaft m.b.H., Austria

[21] Appl. No.: 50,448

[22] PCT Filed: Sep. 25, 1992

[86] PCT No.: PCT/AT92/00121

§ 371 Date: May 19, 1993

§ 102(e) Date: May 19, 1993

[87] PCT Pub. No.: WO93/05853

PCT Pub. Date: Apr. 1, 1993

[30] Foreign Application Priority Data

Sep. 26, 1991 [AT] Austria .................. 1934/91

[51] Int. Cl.[6] .................................................. B32B 9/00
[52] U.S. Cl. .................. 428/220; 428/245; 428/286;
428/292; 428/302; 428/339; 428/364; 428/474.4;
428/484; 428/910; 526/73; 521/919; 264/280;
264/331.17; 264/348; 264/210.4; 156/324
[58] Field of Search .................. 428/292, 364,
428/910, 195, 220, 334, 245, 286, 302,
474.4, 339, 484; 526/73; 521/919; 264/280,
331.17, 348, 210.4; 156/324

[56] References Cited

U.S. PATENT DOCUMENTS

| | | | |
|---|---|---|---|
| 4,171,338 | 10/1979 | Mason | 264/211 |
| 4,272,474 | 6/1981 | Crocker | 264/322 |
| 4,587,163 | 5/1986 | Zachariades | 428/292 |
| 4,597,818 | 7/1986 | Aoyama et al. | 156/308.2 |
| 4,876,049 | 10/1989 | Aoyama et al. | 264/49 |
| 4,923,935 | 5/1990 | Sano et al. | 526/73 |
| 4,925,880 | 5/1990 | Stein | 521/98 |
| 5,055,248 | 10/1991 | Motooka et al. | 264/210.3 |
| 5,189,130 | 2/1993 | Kageyama | 526/352 |

FOREIGN PATENT DOCUMENTS

| | | | |
|---|---|---|---|
| 0340211 | 11/1989 | European Pat. Off. | B29C 59/04 |
| 0447356 | 9/1991 | European Pat. Off. | A63C 5/12 |
| 2658425 | 1/1991 | France | A63C 5/044 |
| 2407971 | 8/1975 | Germany | A63C 5/04 |
| 2726726 | 2/1979 | Germany | A63C 5/04 |
| 3102570 | 1/1980 | Germany | A63C 5/04 |
| 3113360 | 5/1982 | Germany | A63C 5/04 |
| 3004566 | 7/1987 | Germany | B41M 5/26 |
| 273544 | 11/1989 | Germany | A63C 5/044 |
| 570811 | 12/1975 | Switzerland | A63C 5/04 |

Primary Examiner—Patrick J. Ryan
Assistant Examiner—Abraham Bahta
Attorney, Agent, or Firm—Bacon & Thomas

[57] ABSTRACT

The invention concerns a process for manufacturing a strip of ski-coating material made of polyethylene of ultra high molecular weight, wherein a ski-coating strip material 4 manufactured to a thickness of 0.5 to 1.5 mm by a screw extruder, a ram extruder or press sintering with subsequent peeling is made to pass continuously first through a heating zone 1 in which it is heated to temperature above 140° C. and then through a cooling zone consisting of two sizing plates 2, 2' in which it is cooled to a temperature equal to or lower than ambient. This process produces a ski coating of which the crystalline proportion can be adjusted within a range of 25 and 60%, as a result of which improved gliding by the ski coating on snow and improved wax acceptance is assured in comparison with the known methods.

9 Claims, 1 Drawing Sheet

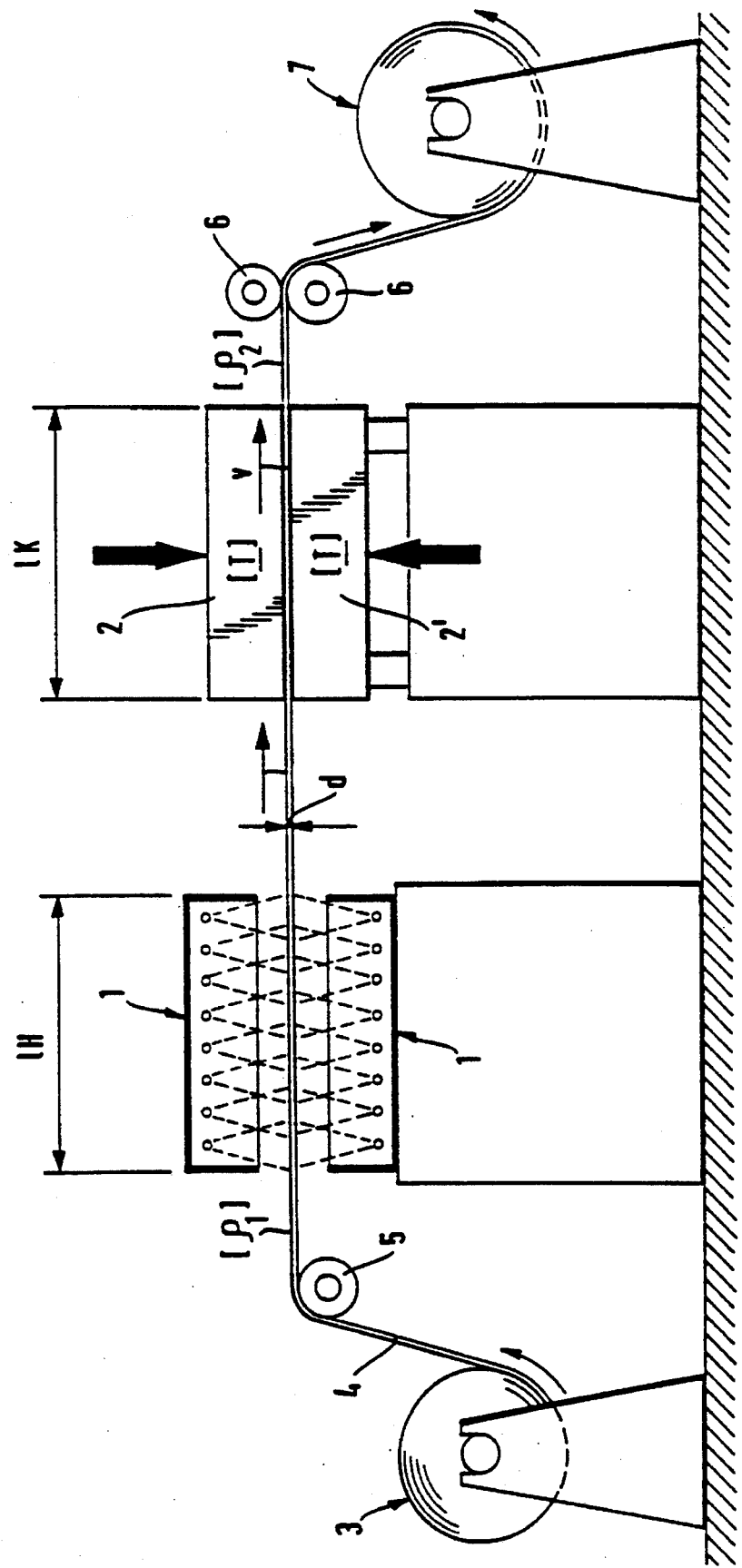

PROCESS FOR PRODUCING A SKI COATING STRIP MADE OF ULTRA HIGH MOLECULAR-WEIGHT POLYETHYLENE

TECHNICAL FIELD

The invention concerns a process for producing a strip of ski coating material made of polyethylene of ultra high molecular weight and a ski coating made by this process and its application.

STATE OF THE ART

The essential properties of a ski running-surface coat are resistance to abrasion and wax acceptance. The resistance to abrasion is determined prevailingly by the molecular weight of the polyethylene whereas the wax acceptance depends on the polyethylene density and hence on the crystal proportion in this polyethylene.

In order to meet the strength requirements of the ski industry regarding polyethylene ski coats, polyethylene of high molecular weight has been processed; this entails polyethylenes of ultra high molecular weights which can be processed only in a restricted number of ways. A preferred procedure of the ski industry is press-sintering. The blocks so made are further worked by peeling into strip-shaped ski-coatings.

The Japanese disclosure Hei 3-215,280 describes a procedure for further processing these ski-coating strips. Lengths of material cut to the corresponding ski lengths are heated in a discontinuous procedure and cooled in an immersion bath, as a result of which the ratio of amorphous to crystal portions in the polyethylene of ultra high molecular weight are set in such a way that the ski coating shall well accept wax. However this procedure incurs the drawback that warping arises at the surfaces of the ski coating on account of rapid cooling, and after finishing in the form of stretching is therefore necessary.

DISCUSSION OF THE INVENTION

The object of the invention is to create a simple process which can be carried out in only a few steps to manufacture a ski-coating strip polyethylene of ultra high molecular weight and allowing to so adjust the crystal portion in the final ski-coating that it shall evince not only high resistance to abrasion but also optimal gliding properties.

This problem is solved in the process of the invention in that a ski-coating strip made by screw extrusion, by ram extrusion or press sintering with ensuing peeling first is uniformly raised to a temperature above 140° C. by continuously moving it through a heating zone and then is uniformly cooled by continuously moving it through a cooling zone to a temperature equal to or lower than ambient.

This process ensures thereby improvement of ski-coating materials made in conventional manner and which are the subject to ever higher requirements by the ski industry regarding especially wax acceptance and ski gliding behavior on snow.

In an advantageous embodiment mode of the invention, the process is characterized in that the ski-coating strip is 0.5 to 1.5 mm thick and is heated in the heating zone by infrared for 10 to 25 sec., preferably between 13 and 20 sec. Moreover the process of the invention is characterized in that the ski-coating strip material is cooled in the cooling zone to a temperature of 10° to 20° C., the cooling zone consisting at least in part of a cooled sizing system. This step is advantageous in that the ski-coating strip retains its smooth surface following cooling and that thereby the otherwise conventional surface-stretching can be eliminated following cooling. In another feature of the invention, it is characterized in that the dwell time of the ski-coating strip in the cooling zone is 8 to 30, preferably 10 to 25 sec.

The advantageous implementations of the process of the invention, such as controlled temperatures both in the heating and in the cooling zones and the dwell time of the ski material in the heating and cooling zones result in that the crystal structure of the initial ski-coating material can slowly disintegrate in the heating zone at a temperature above 140° C. and in that recrystallization can be carried out thereupon in the cooling zone by means of controlled temperature and dwell time. The crystalline proportion of the ski coatings made by the process of the invention therefore can be adjusted in the most precise manner and advantageously shall be between 25 and 60%.

Accordingly this ski coating evinces improved wax acceptance and improved gliding behavior on snow than the known ski coatings illustratively made by sintering. Furthermore the high abrasion resistance is assured on account of the molecular weight of the polyethylene being used.

The process of the invention also relates to using a ski coating for making downhill and cross-country skis.

In relation to precise control of the polyethylene's crystalline proportion in the ski coating, such a ski coating made by the process of the invention will be suitable both for manufacturing downhill skis and cross-country skis even though different requirements are set in each case on the ski-coating's gliding behavior and its wax acceptance.

DESCRIPTION OF THE FIGURES

The invention is elucidated below in relation to a FIGURE and illustrative implementations.

The FIGURE is a sketch in side view of equipment with which to carry out the process of the invention and consisting of a heating zone 1 and a cooling zone comprising sizing plates 2, 2'.

The process of the invention is discussed in detail in the following general operational procedure:

The ski-coating material 4, which may have been manufactured in known manner by means of screw extruders, ram extruders or press-sintering, is taken off a supply roll 3 and is moved over the deflecting roller 5 and fed at a speed v (m/min) into the heating zone 1 illustratively equipped with infrared heating elements. The heating zone is 1(H) long and therein the polyethylene of ultra high molecular weight will melt at a temperature above 140° C. The dwell time of the ski-coating material is proportional to the length 1(H) and determines to what extent the crystal structure will disintegrate. Thereupon the molten ski-coating material is moved into the cooling zone consisting of two sizing plates 2, 2'. These plates 2, 2' serve on one hand to shape the molten ski-coating material and on the other hand to cool it. The polyethylene of ultra high molecular weight recrystallizes during this cooling; this procedure also depends on the dwell time of the ski-coating material, which is proportional to the length 1(K) of the cooling zone. Thereupon the cooled ski-coating material moves between the pair of evacuation rollers 6 to be wound on the take-up roll 7.

The crystalline proportion of the polyethylene of high molecular weight is not linearly proportional to the density;

therefore the densities were measured before heating, namely $\rho_1$, and after cooling, namely $\rho_2$. The Table below shows the process parameters of three illustrative implementations.

|   | $p_1[g/cm^3]$ | $p_2[g/cm^3]$ | d[mm] | v[m/min] | l(H) [cm] | l(K)[cm] | T(°C.) |
|---|---|---|---|---|---|---|---|
| 1 | 0.940 | 0.925 | 1.3 | 1.5 | 40 | 40 | 20 |
| 2 | 0.940 | 0.925 | 1.3 | 4 | 100 | 80 | 10 |
| 3 | 0.940 | 0.920 | 0.8 | 1.5 | 40 | 60 | 10 | where $\rho_1$= density before crystallization; $\rho_2$= density after crystallization; d= ski-coating thickness; l(H)= length of heating zone; l(K)= length of cooling zone; T= cooling temperature.

The formula t= s/v determines the particular dwell times given in seconds:

|   | t(H) | t(K) |
|---|---|---|
| 1 | 16 | 16 |
| 2 | 16 | 12 |
| 3 | 16 | 24 | where t(H) is the heating-zone dwell-time and t(K) is the cooling-zone dwell-time.

The following graph shows the relation between density and degree of crystallization:

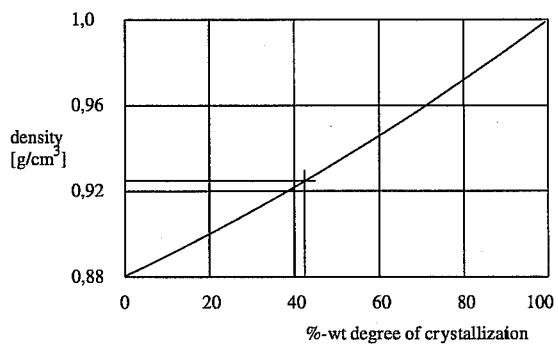

A density of 0.88 g/cm³ was assumed for amorphous polyethylene and of 1.0 g/cm³ for crystalline polyethylene. Illustratively a degree of crystallization of about 45% may be associated with $\rho_2$= 0.925 g/cm³. Accordingly, using the process of the invention, the degree of crystallization of the polyethylene of ultra high molecular weight of ski-coating materials manufactured in known manner can be controlled, so that a ski coating with optimal resistance to abrasion and wax acceptance and optimal gliding behavior on snow is now made available.

COMMERCIAL USEFULNESS

The ski coating made by the process of the invention is used in the manufacture both of downhill skis and of cross-country skis.

We claim:

1. A process for manufacturing a strip of ski-coating material made at least in part of a polyethylene of ultra high molecular weight, said process comprising the steps of:

continuously moving a ski-coating material of a thickness between 0.5 and 1.5 mm from a roll of said material first into a heating zone to be uniformly heated to a temperature of at least 140° C. and then into a cooling zone formed at least in part by a cooled sizing apparatus to be uniformly cooled and sized for a dwell time between 8 and 30 second to a temperature of at most ambient temperature and winding said cooled and sized material onto a take-up roll.

2. Process defined in claim 1, wherein the ski-coating strip material is heated by infrared in the heating zone.

3. Process defined in claim 1, wherein the ski-coating strip material is heated from 10 to 25 seconds.

4. Process defined in claim 1, wherein the strip-like ski-coating material is cooled to a temperature of 10° C. to 20° C. in the cooling zone.

5. Ski coating manufactured by a process defined in claim 1, wherein its crystalline proportion is 25 to 60%.

6. Process defined in claim 1, wherein the ski-coating strip material is heated from 13 to 20 seconds.

7. Process defined in claim 1, wherein the dwell time of the ski-coating strip material is 10 to 25 seconds.

8. A downhill ski containing the ski coating defined in claim 5.

9. A cross-country ski containing the ski coating defined in claim 5.

* * * * *